March 25, 1952 R. GUILLEMINOT ET AL 2,590,768
APPARATUS FOR CONTINUOUSLY PRODUCING
CORRUGATED GLASS SHEETS
Filed Aug. 21, 1947
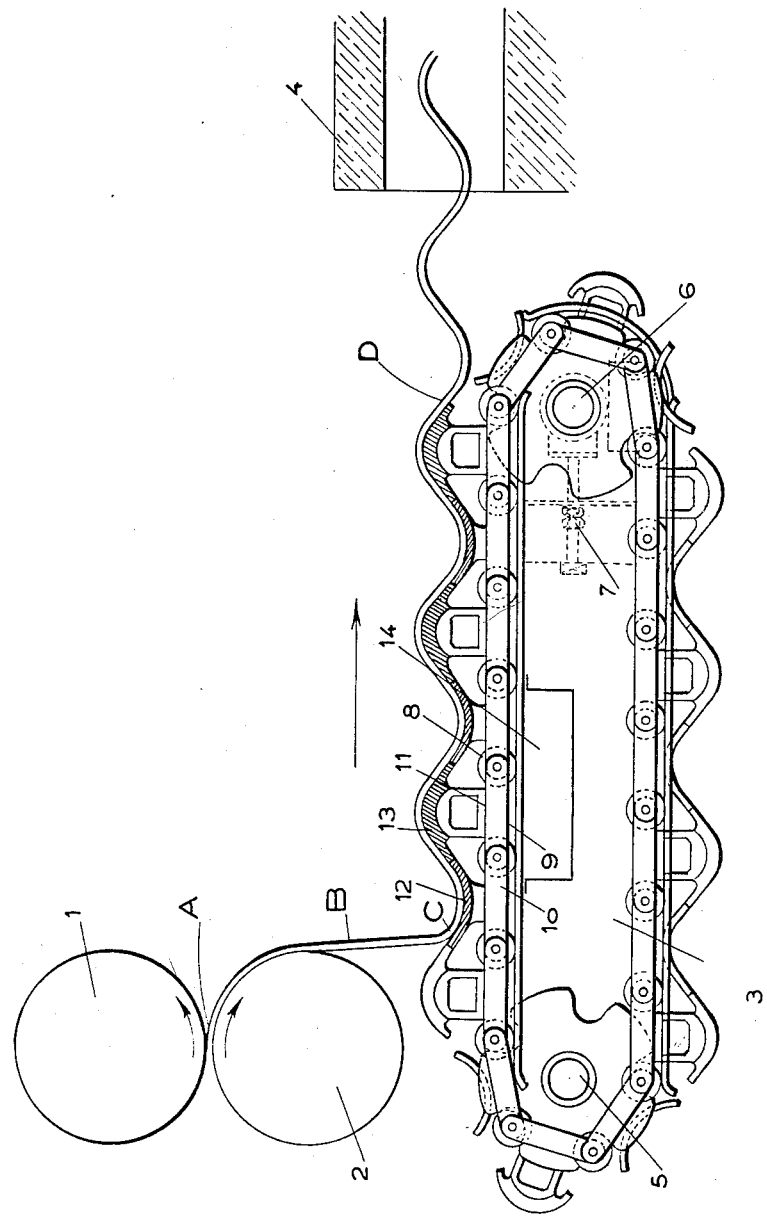
INVENTORS
ROGER GUILLEMINOT
& RENÉ GUILLEMINOT
BY Young, Emery & Thompson
ATTYS.

Patented Mar. 25, 1952

2,590,768

UNITED STATES PATENT OFFICE 2,590,768

APPARATUS FOR CONTINUOUSLY PRODUCING CORRUGATED GLASS SHEETS

Roger Guilleminot, Paris, and René Guilleminot, Quievrechain, France

Application August 21, 1947, Serial No. 769,868
In France May 13, 1947

1 Claim. (Cl. 49—3)

This invention relates to the production of corrugated glass sheets.

The present invention has for its object to provide apparatus for directly and continuously producing a sheet of corrugated glass from a sheet of glass having any other desired configuration.

In using the apparatus, the glass, rolled between two rolls is, upon emerging from out of the rolls, delivered in a plastic condition on a movable surface which is corrugated or has any other desired configuration, and to the shape of which the glass mass is adapted to conform.

The glass, retained on said surface for a sufficiently long time to cool below its softening point, during a suitable displacement of the surface, hardens and may be separated from the surface without any deformation, to be fed into the annealing furnace.

This apparatus which is particularly simple, provides for the production of a continuous formed sheet of glass in a single operation without involving any special handling of the material. In particular it enables the production of a continuous uniformly corrugated or undulated glass web of constant width, which is then cut to the desired length.

The glass at the outlet of the rolling means in a pasty condition, drops as a continuous web of pre-determined thickness onto the movable surface.

Because of its plastic character, it exactly conforms with the shape of said surface, being in effect moulded on said surface. The displacement of the movable surface is synchronised with the linear development of the rolls, so as to accurately correlate the output of the rolls and of the movable surface, and thus avoid any thinning out or thickening of the final glass sheet produced.

Upon contact with a movable surface, the glass cools and its temperature soon drops below the softening point. Such cooling could moreover be accelerated by the projection of a cold fluid or more generally may be adjusted by any appropriate means. After a more or less extensive displacement of the movable surface, the glass will have set in the form imparted to it by said surface. The glass has then become rigid enough to be separated from said surface without being subjected to any substantial distortion and may be moved without any support into the annealing furnace.

The movable surface may be embodied by any suitable mechanical means. It is desirably formed by an endless chain conveyor the upper flight of which presents the desired configuration, such as corrugated or otherwise. In particular, said endless chain may be comprised of articulated elements on which are arranged alternately concave and convex surface elements, juxtaposed with each other to form a continuous undulated or corrugated surface adapted to mould the continuous glass sheet.

The single figure of the accompanying drawing illustrates by way of example one form of apparatus embodying the invention.

The installation comprises a pair of rolling cylinders or rolls I and 2, an endless chain conveyor 3 and an annealing furnace 4. The conveyor 3 is, in the arrangement shown, composed of successive links pivotally interconnected with each other and trained about a pair of end drums 5 and 6. At least one of these drums is a driving drum for the chain. A tension adjusting device 7 for the chain is provided on either one or both of the drums 5 and 6.

The successive links are interconnected by transversely extending pins which at each end carry rollers 8 riding on runways 9 to facilitate the movement of the chain.

With the successive links there are associated elements forming "moulds" adapted to receive the glass as delivered from the rolls I and 2 and producing the desired configuration thereof.

In the example shown, two successive links such as 10 and 11 carry, a concave surface element 12, and a convex surface element 13 respectively. The elements 12 and 13 are so designed that when they form the upper flight of the chain conveyor 3, they are in juxtaposed relationship.

The whole assembly of links provided with alternately concave and convex moulding elements thus together forms a continuous surface. The elements 12 and 13 are preferably made of cast iron.

Cooling means for the upper flight of the chain conveyor, comprising for instance air boxes such as 14 adapted to deliver a blast of cold air, may be provided between the upper and lower flights of the chain or below the chain.

The molten glass is conducted by known means to the rolling cylinders or rolls I and 2. The rolled glass is delivered therefrom at A in a pasty state. By gravity, it drops in the form of a flat web B upon the conveyor 3 and engages at C the undulated surface formed by the successive elements 12—13. Being still at a temperature above its softening point, the glass is plastic and its weight causes it to conform with the undulated surface 12, 13.

The conveyor 4, the undulated surface of which is formed by the successive elements 12—13, is continuously fed in the direction of the arrow. The glass web deposited at C and conforming to the shape of the undulated surface is thus continuously fed along from C to D.

Between C and D, the glass sheet cools either freely, or under the action of a blast of cooling fluid projected from above or from below or both.

At D, the glass is in a sufficiently cool state so that, having reached a temperature below its point of pliability, it has in effect set, that is, it is sufficiently hard to resist further plastic deformation. The glass having become rigid at the point where the flight of the chain conveyer passes down around the drum 6, separates from the chain and the thus finally conformed and hardened glass sheet is fed into the annealing furnace 4 whence, after annealing, it emerges in the form of a continuous web of constant thickness.

The links 10 and 11 respectively carrying the moulding elements 12—13 having separated from the undulated glass sheet, pass around the drum 6 and are returned forwardly of the conveyor to return, after having passed over the drum 5, to the initial point A. During this travel, the elements 10—13 are cooled and are again capable of receiving the pastry rolled glass to conform and cool the same.

Of course, the arrangement described and illustrated has been given merely by way of a non-restrictive example. Rather than providing an undulated surface, the elements 12—13 could be so designed as to present any desired form which it may be required to impart to a continuous length of sheet glass.

What is claimed is:

A device for the continuous production of corrugated glass sheet which comprises a pair of feed rollers adapted to continuously feed rolled glass sheet, an endless chain beneath said rollers, a plurality of interpivoted alternately concave and convex elements supported by said chain, said elements being adapted to lie in juxtaposed relationship throughout the horizontal reach of said chain to form a continuous undulated surface and to be separated away from one another at the end of said chain.

ROGER GUILLEMINOT.
RENÉ GUILLEMINOT.

REFERENCES CITED

The following references are of record in the file of this patent:

UNITED STATES PATENTS

| Number | Name | Date |
|---|---|---|
| 972,433 | Blackmore | Oct. 11, 1910 |
| 1,217,614 | McCoy | Feb. 27, 1917 |
| 2,350,996 | Atkinson et al. | June 13, 1944 |

FOREIGN PATENTS

| Number | Country | Date |
|---|---|---|
| 585,154 | France | Feb. 23, 1925 |